United States Patent [19]

Matsuoka et al.

[11] 4,352,926
[45] * Oct. 5, 1982

[54] BIAXIALLY DRAWN POLYHEXAMETHYLENE ADIPAMIDE FILM AND PROCESS FOR PRODUCING SAME

[75] Inventors: Yukinori Matsuoka, Moriyama; Yoshihiko Muto, Kawasaki; Mitsuo Kohno, Yokohama, all of Japan

[73] Assignee: Asahi Kasei Kogyo Kabushiki Kaisha, Osaka, Japan

[*] Notice: The portion of the term of this patent subsequent to Feb. 28, 1998, has been disclaimed.

[21] Appl. No.: 149,580

[22] Filed: May 14, 1980

Related U.S. Application Data

[62] Division of Ser. No. 956,267, Oct. 31, 1978, Pat. No. 4,252,966.

[30] Foreign Application Priority Data

Nov. 18, 1977 [JP] Japan .................... 52-137787

[51] Int. Cl.³ .............................................. C08G 69/26
[52] U.S. Cl. .................................... 528/335; 264/565; 264/290.2; 528/310
[58] Field of Search .............................. 264/565, 290.2; 528/310, 335; 428/220

[56] References Cited

U.S. PATENT DOCUMENTS

| | | | |
|---|---|---|---|
| 3,304,352 | 2/1967 | Gerow | 264/565 X |
| 3,400,184 | 9/1968 | Matsuo et al. | 264/565 X |
| 3,502,766 | 3/1970 | Tsuruta et al. | 528/310 X |
| 3,510,552 | 5/1970 | Tsuruta et al. | 528/310 X |
| 3,608,019 | 9/1971 | Sato et al. | 264/565 |
| 3,632,728 | 1/1972 | Kuga et al. | 528/310 X |
| 3,788,503 | 1/1974 | Hirose et al. | 264/565 |
| 3,794,547 | 2/1974 | Kuga et al. | 428/220 |
| 3,950,466 | 4/1976 | Hasler | 264/565 |

Primary Examiner—Philip Anderson
Attorney, Agent, or Firm—Finnegan, Henderson, Farabow, Garrett & Dunner

[57] ABSTRACT

Disclosed is a biaxially drawn polyhexamethylene adipamide film having a relative viscosity of at least 3.2 as measured at 25° C. in aqueous 96% $H_2SO_4$, a degree of crystallinity of from 35% to 45%, a birefringence ($\Delta n$) of not more than 0.006, as determined at any point in its entire area, and an initial modulus of elasticity in tension of at least 230 kg/mm² as determined in ay direction across substantially its entire area. The film may be produced by a process wherein molten polyhexamethylene adipamide is extruded through a circular die gap and the tubular extrudate is brought in sliding contact with the outer periphery of an inside mandrel, thereby to be cooled, which process is characterized in that polyhexamethylene adipamide having a relative viscosity of from 3.3 to 5.0, as measured at 25° C. in aqueous 96% $H_2SO_4$, is used; the tubular extrudate formed therefrom is cooled at a cooling rate (X° C./sec.) satisfying the following formula with respect to the relative viscosity of the polymer used, $$-100 \times \eta\text{rel} + 1,200 < X < -170 \times \eta\text{rel} + 2,150$$

at least in the cooling stage in which the tubular extrudate is cooled from 250° C. to 150° C., and; then, the obtained tubular film is concurrently biaxially drawn.

6 Claims, 4 Drawing Figures

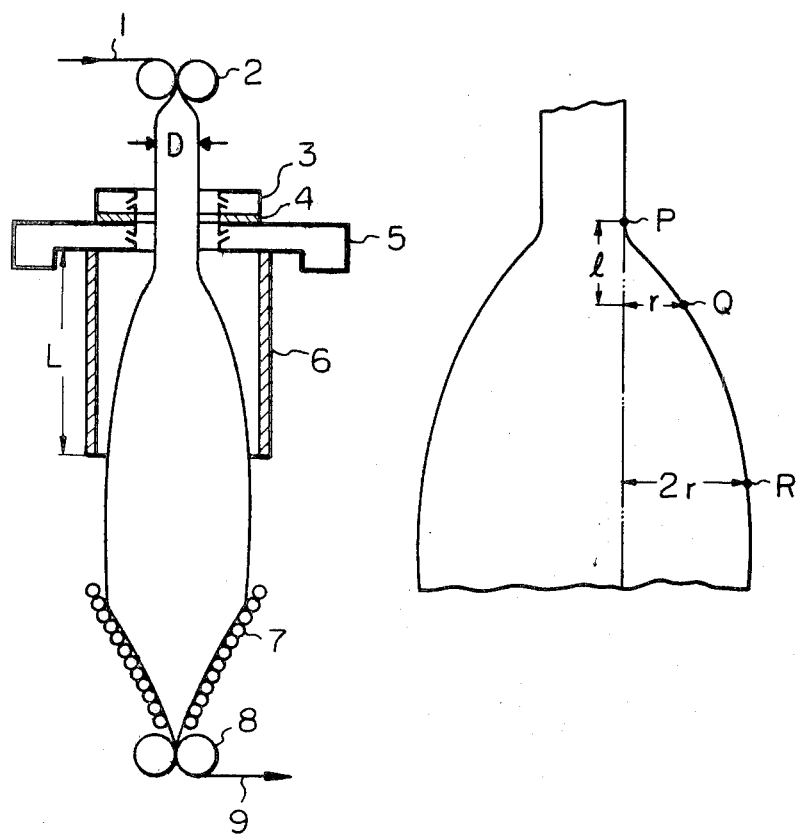

BIAXIALLY DRAWN POLYHEXAMETHYLENE ADIPAMIDE FILM AND PROCESS FOR PRODUCING SAME

This is a division of application Ser. No. 956,267 filed Oct. 31, 1978, now U.S. Pat. No. 4,252,966.

This invention relates to a biaxially drawn polyhexamethylene adipamide film exhibiting little or no anisotropy and to a process for producing the same. The isotropic polyhexamethylene adipamide film of the present invention is characterized as possessing improved toughness and dimensional stability to hot water, and being useful as a packaging film material particularly for a high temperature retortable pouch. The term "high temperature retortable pouch", which sometimes is replaced by the term "high temperature short time retortable pouch", is hereinafter referred to "high retort pouch" for brevity.

Many polymeric materials have been heretofore used as packaging film materials, including, for example, polyolefins, polyvinyl alcohol, polyvinyl chloride, polyvinylidene chloride, polyesters and nylon-6 (poly-epsilon-capramide). Among these packaging film materials, biaxially drawn nylon-6 and polyethylene terephthalate films have been used for packaging retorting foods because these nylon-6 and polyethylene terephthalate films are relatively satisfactory in toughness, gas barrier properties, transparency, luster and thermal resistance. In recent years, a means of imparting particularly enhanced toughness and thermal resistance to packaging film materials for retorting foods has been very much desired.

It has been acknowledged in the field of packaging films that penetration strength (i.e., stress-breaking resistance as measured by penetrating a loaded punch into the film) is important as a measure for evaluating the resistance of films against breaking and penetration caused during the handling and transportation of the packages. Therefore, the terms "toughness" and "tough" used in this specification refer to stress-breaking resistance and stress-breaking resistant.

With regard to the thermal resistance of packaging films, dimensional stability to hot water or steam is important. Poorness in dimensional stability to hot water or steam means that, when food packages are subjected to retorting in hot water or steam, the packaging films exhibit undesirably large dimensional change (or shrinkage), that is, the packages are distorted in shape and sometimes broken.

Conventional biaxially drawn nylon-6 films are not completely satisfactory as films for high retort pouch. This is because such nylon-6 films shrink to a considerable extent when they are subjected to retorting, the furthermore, the nylon-6 films are not tough enough for use in heavy and voluminous packages. Conventional biaxially drawn polyethylene terephthalate films have no problem in dimensional stability to hot water or steam, but are far poorer in toughness than the above-mentioned nylon-6 films.

Biaxially drawn nylon-66 films are referred to, for example, in U.S. Pat. Nos. 3,794,547 and 3,502,766 and Japanese Laid-open Patent Application No. Sho 50-61. In the U.S. patents, the films are drawn by using a tenter, and in the Japanese patent application they are drawn by using a tubular biaxial stretcher. However, biaxially drawn nylon-66 films are not specifically disclosed in these patent specifications, and only biaxially drawn nylon-6 films are disclosed therein in detail.

It has already been proposed to produce biaxially drawn polyhexamethylene adipamide films in Japanese Laid-open Patent Application No. 49,268/1976. In this process, undrawn polyhexamethylene adipamide films are drawn sequentially in the transverse direction and in the machine (i.e., longitudinal) direction. However, the resulting biaxially drawn polyhexamethylene adipamide films are still not completely satisfactory in stress-breaking resistance and dimensional stability to hot water or steam, and particularly in isotropy of these characteristics. This is because, when undrawn polyhexamethylene adipamide films are drawn not concurrently but sequentially in the transverse and longitudinal directions, the molecular orientation in the resulting drawn films tends to be more predominant in the direction in which the films are drawn in the latter stage than in the direction in which they are drawn in the first stage, and it is difficult to exactly balance the molecular orientations in the transverse and longitudinal directions.

It is generally said that films made of a polymer having a flexible molecular structure are tougher than those made of a polymer having a rigid molecular structure. It has been found, however, to the inventor's surprise that, although polyhexamethylene adipamide films possess a molecular orientation more regular than that observed in polycapramide films, the former films, particularly those which are biaxially drawn, are superior in toughness to the latter films. Furthermore, it has been found that, among polyhexamethylene adipamide films, those exhibiting a substantially complete isotropy in molecular orientation and those having a degree of polymerization not lower than a certain degree are excellent for the desired toughness.

Even if undrawn polyhexamethylene adipamide films are simultaneously biaxially drawn in a conventional manner using a tenter, a so-called "bowing phenomenon" inevitably occurs and, thus, the resulting films are poor in isotropy of the dimensional stability. Furthermore, even if undrawn polyhexamethylene adipamide films are intended to be drawn by a biaxial tubular stretching technique, substantially amorphous undrawn polyhexamethylene adipamide films are difficult to produce. This is because polyhexamethylene adipamide has a higher melting point and exhibits a higher rate of crystallization, than those of polycapramide, and further, contains a relatively large amount of low melting materials such as oligomers.

It is a main object of the present invention to provide a biaxially drawn polyhexamethylene adipamide film exhibiting enhanced stress-breaking resistance and dimensional stability to hot water or steam, and enhanced isotropy of these characteristics.

It is another object of the present invention to provide a biaxially drawn polyhexamethylene adipamide film possessing improved toughness and reduced shrinkage in steam or hot water, and which is useful as a packaging film material, particularly for a high temperature-retortable pouch.

In one aspect of the present invention, there is provided a biaxially drawn polyhexamethylene adipamide film having a relative viscosity of at least 3.2 as measured at a temperature of 25° C. in aqueous 96% sulfuric acid, a degree of crystallinity of 35 to 45% as measured according to a gradient tube density determining method, a birefringence ($\Delta n$) of not more than 0.006 as determined at any point in its entire area and a modulus of elasticity in tension of at least 230 kg/mm² as determined in any direction across substantially its entire area.

BRIEF DESCRIPTION OF THE DRAWINGS

FIG. 1 is a schematic view, in cross-section, of a biaxial tubular stretcher useful for producing biaxially drawn film in accordance with the technique of the present invention.

FIG. 2 is a schematic view showing in greater detail the cross-section of a film bubble produced by the tubular biaxial stretcher of FIG. 1.

DESCRIPTION OF PREFERRED EMBODIMENTS

Figure 3:
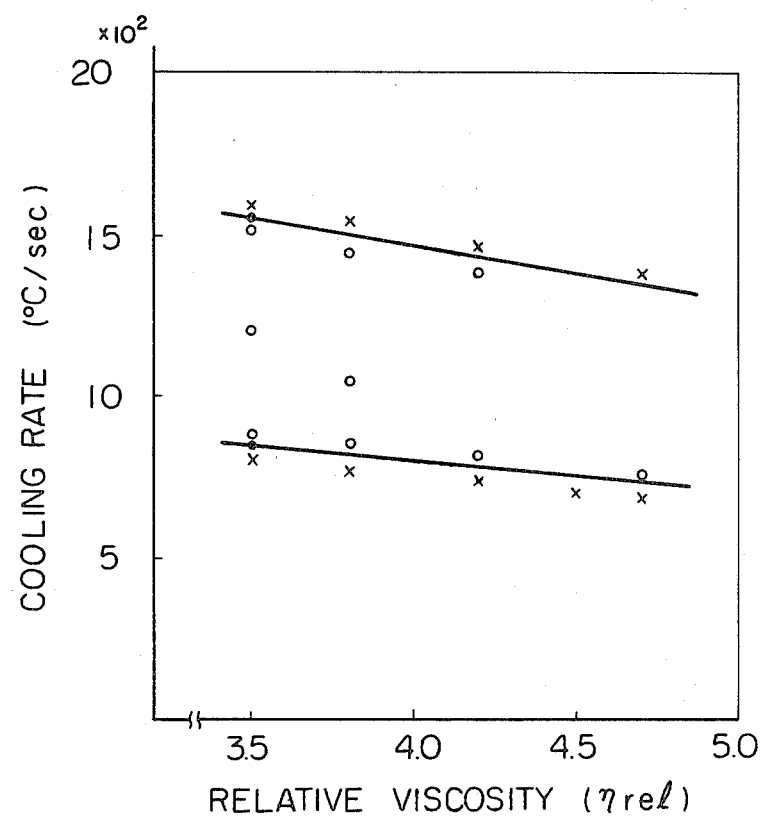
FIG. 3 is a graph plotting cooling rate vs. relative viscosity.

The film of the present invention preferably possesses a thickness of from 5 to 60 microns, more preferably from 10 to 25 microns.

The film of the present invention preferably possesses a penetration strength (as determined in accordance with the method hereinafter described) of at least 0.6 kg, more preferably at least 0.7 kg, per 15 microns film thickness. Whereas, commercially available biaxially drawn nylon-6 films, which are said to be the most tough among polymer films on the market, possess a penetration strength of at most approximately 0.55 kg/15 microns film thickness. Furthermore, the film of the present invention preferably possesses a shrinkage of not more than 5%, more preferably not more than 3%, as determined by exposure to steam at a temperature of 135° C. for 10 minutes.

Furthermore, the film of the present invention usually exhibits improved gas barrier properties, and its permeability to molecular oxygen is not more than 50 cc/m².day.atm, in terms of 15 microns film thickness.

The film of the present invention is comprised of polyhexamethylene adipamide. However, copolyhexamethylene adipamide, i.e. a polycondensate made from a predominant amount of a hexamethylenediamine ingredient, a predominant amount of an adipic acid ingredient and a minor amount of at least one comonomer ingredient (which may be another diamine and/or another dibasic acid) may be used. A polyblend comprised of a predominant amount of polyhexamethylene adipamide and a minor amount of at least one other miscible polymer may also be used. The amount of the comonomer in the copolyhexamethylene adipamide and the amount of the miscible polymer in the polyblend should generally be up to approximately 10% by weight. The flim-forming polyhexamethylene adipamide material used may have incorporated therein minor amounts of conventional additives such as lubricant, stabilizer, pigment and dyestuff.

The relative viscosity ($\eta$ rel; as measured at a temperature of 25° C. in aqueous 96% sulfuric acid) of at least 3.2 is crucial for the desired penetration strength. When the relative viscosity is less than 3.2, it would be difficult or even impossible to obtain a film having a penetration strength of at least 0.6 kg/15 microns film thickness even though all of the other requisites are satisfied. Preferably, the relative viscosity should be in the range of from 3.2 to 5.0.

The birefringence ($\Delta n$) of not more than 0.006 at any point in the entire area of the film and the initial modulus of elasticity in tension, of at least 230 kg/mm² in any direction across substantially the entire area of the film are also crucial for the desired penetration strength. These requisites mean that the polymer film of the present invention exhibits a high degree of molecular orientation, and the oriented molecules are distributed in a substantially completely random manner over the entire area of film.

By the term "birefringence" used herein is meant $\Delta n$ which is defined by the formula:

$$\Delta n = |n_X - n_Y|$$

wherein $n_X$ and $n_Y$ are refractive indexes as measured in the longitudinal direction (i.e., the machine direction) and in the transverse direction (i.e., in the direction perpendicular to the longitudinal direction), respectively. The refractive indexes are determined by using a polarizing microscope provided with a Berek compensator.

The fact that the oriented molecules are distributed in a substantially completely random manner over the entire area of the film means that the film has improved stress-breaking resistance, and is improved in penetration strength, abrasion resistance and flexural fatigue resistance, and thus, the film is not readily broken and pinholes are not readily made therein.

Preferably, the film of the present invention should possess a birefringence of from 0.000 to 0.006 and an initial modulus of elasticity in tension of from 230 to 350 kg/mm².

Furthermore, the film of the present invention has a degree of crystallinity of from 35% to 45% as determined on the heat-treated film according to a gradient tube density determining method. The degree of crystallinity has a close relationship to the dimensional stability of the film under high temperature-retorting conditions and, further, to the undesirable whitening of the film of the retorted pouch, which phenomenon is presumed to occur due to oxidative degradation of the film. When the degree of crystallinity is less than 35%, the shrinkage of the film under high temperature-retorting conditions cannot be restrained from being below the practically acceptable lower limit, i.e. below approximately 5%. In contrast, when the degree of crystallinity exceeds 45%, the shrinkage of the film under high temperature-retorting conditions can be satisfactorily reduced, but the retorted film becomes whitened.

The degree of crystallinity is determined as follows. A film specimen, immediately after it is biaxially drawn and then heat-treated, is placed in a desiccator. Twenty four hours after, the density of the film specimen is measured by using a gradient density tube filled with a carbon tetrachloride-toluene mixture maintained at a temperature of 25° C. The degree of crystallinity (x) is calculated according to the following equation.

$$X(\%) = \frac{d_c(d - d_a)}{d(d_c - d_a)} \times 100$$

where,
X: degree of crystallinity (%)
$d_c$: density of the crystalline phase (1.24)
$d_a$: density of the amorphous phase (1.09)
d: density of the film By the term "penetration strength", which is herein used as a measure of whether the film is resistant to stress-breaking, i.e., pinholes are not made therein, we mean the maximum load in kg which is determined as follows according to Japanese Agricultural Standard-(JAS)—Retortable Pouch Food, described in Notification No. 1019 of the Japanese Agricultural Department, dated Oct. 23, 1975. That is, a load-increasing pouch having a diameter of 1 mm and having a curvature radius of 0.5 mm at one end thereof is dropped at a constant speed of 50 mm/min. onto a tentered film specimen until the punch penetrates the specimen. The relationship between the load and the elongation of the film specimen is plotted in a graph, and the maximum value of the load in the graph is the penetration strength.

The dimensional stability of the film to hot water or steam is expressed in this specification by the shrinkage (%) of the film, which is determined as follows. A film strip of a 10 cm×1 cm size is placed in a retort and exposed to superheated steam or pressurized hot water at a temperature of 135° C. for 10 minutes. Then, the film strip was cooled in a water bath for 5 minutes, and then, dried. The length (l:cm) of the dried film strip is measured. The shrinkage of the film is calculated by the following equation.

$$\text{Shrinkage}(\%) = \frac{(10 - l)}{10} \times 100$$

The film of the present invention has preferably a shrinkage of from 0.5% to 5% as determined by the procedure mentioned above.

In another aspect of the present invention, there is provided a process for producing a biaxially drawn polyhexamethylene adipamide film wherein molten polyhexamethylene adipamide is extruded through a circular die gap and the tubular extrudate is brought in sliding contact with the outer periphery of an inside mandrel thereby to be cooled, characterized in that polyhexamethylene adipamide having a relative viscosity ($\eta$ rel) of from 3.3 to 5.0, as measured at a temperature of 25° C. in aqueous 96% sulfuric acid, is used, and the tubular extrudate formed therefrom is cooled at a cooling rate (X° C./sec.) satisfying the following formula with respect to the relative viscosity ($\eta$ rel) of the polymer used.

$$-100 \times \eta\text{rel} + 1{,}200 < X < -170 \times \eta\text{rel} + 2{,}150$$

at least in the cooling stage in which the tubular extrudate is cooled from 250° C. to 150° C., and then, the obtained tubular film is concurrently biaxially drawn.

Polyhexamethylene adipamide having a relative viscoisty ($\eta$rel) of from 3.3 to 5.0, preferably from 3.5 to 4.8 is used. The polyhexamethylene adipamide is melted in a conventional manner and preferably at a temperature of 280° C. to 300° C., and the melt is extruded through a die having a circular gap. The tubular extrudate is cooled by bringing it in sliding contact with the outer periphery of an inside mandrel, the temperature of which is controlled by circulating therein a cooling liquid medium such as water. The inside mandrel is usually arranged in a position such that the axis of the mandrel is in agreement with a line perpendicular to the die surface having the circular gap and passing the center of the circular gap.

The main point of the above-mentioned process resides in the cooling rate of the tubular extrudate. The speed of spherulite formation occurring in the solidification course of molten polyhexamethylene adipamide is much faster than that of molten poly-epsilon-capramide. That is, the maximum spherulite formation speed of polyhexamethylene adipamide is 4.7 times the maximum spherulite formation speed of poly-epsilon-capramide, as described in B. B. Burnett and W. F. McDessit: J. Appln. Physics, 28, P1101. Therefore, if molten polyhexamethylene adipamide is cooled in a conventional manner popularly employed in the production of poly-epsilon-capramide films, the resulting cooled film contains spherulite to a considerable extent and is difficult to draw uniformly.

The cooling rate in the process of the present invention is important for the desired substantially amorphous undrawn film. The cooling rate can be determined by directly contacting with a film a thermistor or thermocouple having a low heat capacity at the contacting portion.

The importance of the cooling rate will be seen from the following example. Four polyhexamethylene adipamide resins having a relative viscosity of 3.5, 3.8, 4.2 and 4.7 were separately formed into films by melt-extruding each resin at a temperature of 285° C. through a circular die. Each tubular extrudate was brought in sliding contact with the outer periphery of a metal inside mandrel having an outer diameter of 155 mm, thereby to obtain a cooled undrawn tubular film having a thickness of 120 microns and a section uniformity of ±3%. The cooling rate of each tubular extrudate was controlled as shown in Table I, below, by varying the temperature and the flow rate of cooling water circulated in the inside mandrel. Each undrawn film was biaxially drawn concurrently in the longitudinal direction (i.e., machine direction; hereinafter abbreviated as "M.D.") and the transverse direction (hereinafter abbreviated as "T.D.") by using a biaxial tubular stretcher of the type shown in FIG. 1. The drawing temperature was 100° C. and the drawing ratio was 3.0 in both the M.D. and T.D. The film-forming properties are shown in Table I, below. The drawability are shown in Table I, below, and FIG. 3.

TABLE I

| Run No. | $\eta$rel | Cooling rate (°C./sec) | Film-forming property | Drawability* |
| --- | --- | --- | --- | --- |
| 1 | 3.5 | 800 | good | B |
| 2 | 3.5 | 880 | good | A |
| 3 | 3.5 | 1,500 | good | A |
| 4 | 3.5 | 1,600 | Faint white spots found and film not uniform | — |
| 5 | 3.8 | 770 | good | B |
| 6 | 3.8 | 850 | good | A |
| 7 | 3.8 | 1,050 | good | A |
| 8 | 3.8 | 1,460 | good | A |
| 9 | 3.8 | 1,550 | Faint white spots found and film not uniform | — |
| 10 | 4.2 | 740 | good | B |
| 11 | 4.2 | 810 | good | A |
| 12 | 4.2 | 1,390 | good | A |
| 13 | 4.2 | 1,470 | Faint white spots found and film not uniform | — |
| 14 | 4.7 | 690 | good | B |
| 15 | 4.7 | 750 | good | A |
| 16 | 4.7 | 1,300 | good | A |
| 17 | 4.7 | 1,370 | Faint white spots found and film | — |

TABLE I-continued

| Run No. | ηrel | Cooling rate (°C./sec) | Film-forming property | Drawability* |
|---|---|---|---|---|
| | | | not uniform | |

*A: The film bubble was stable for a long period of time and the drawing could be effected without any trouble.
B: The film bubble was not stable and the film was often broken.

As can be seen from Table I and FIG. 3, when the cooling rate is less than $(-110 \times \eta rel + 1,200)$°C./sec., it is difficult to smoothly and uniformly draw the undrawn film. In contrast, when the cooling rate exceeds $(-170 \times \eta rel + 2,150)$°C./sec., air is undesirably allowed to enter a space between the film and the inside mandrel, thereby forming faint white-colored spots on the film in the solidification course of the molten tubular extrudate even if the unevenness in temperature and thickness of the tubular extrudate is minimized as much as possible, and thus, it is difficult to obtain a uniform undrawn film of a good appearance.

The cooling rate of the film may conveniently be controlled by choosing, for example, the material of the inside mandrel, the flow rate and temperature of the cooling liquid circulated inside the mandrel and the temperature of the film to be brought into contact with the mandrel. Cooling air or cooling water may additionally be blown against the outer periphery of the tubular extrudate.

As the inside mandrel material, a metallic material of good thermal conductivity, good machinability and moderate hardness may be used, for example: iron and its alloy, such as carbon steel; aluminum and its alloy, such as duralumin, and; copper and its alloy, such as bronze or brass.

It is surprising that the suitable cooling rate of the film varies depending upon the relative viscosity, i.e., the degree of polymerization, of the polymer. This phenomenon is presumed to be peculiar to the cooling process utilizing an inside mandrel, and to be closely related to the fact that the melt tension of the tubular extrudate brought in contact with the mandrel varies depending upon the degree of polymerization and the fact that the rate of crystallization depends upon the degree of polymerization.

DETAILED DESCRIPTION OF THE DRAWINGS

Figure 4:
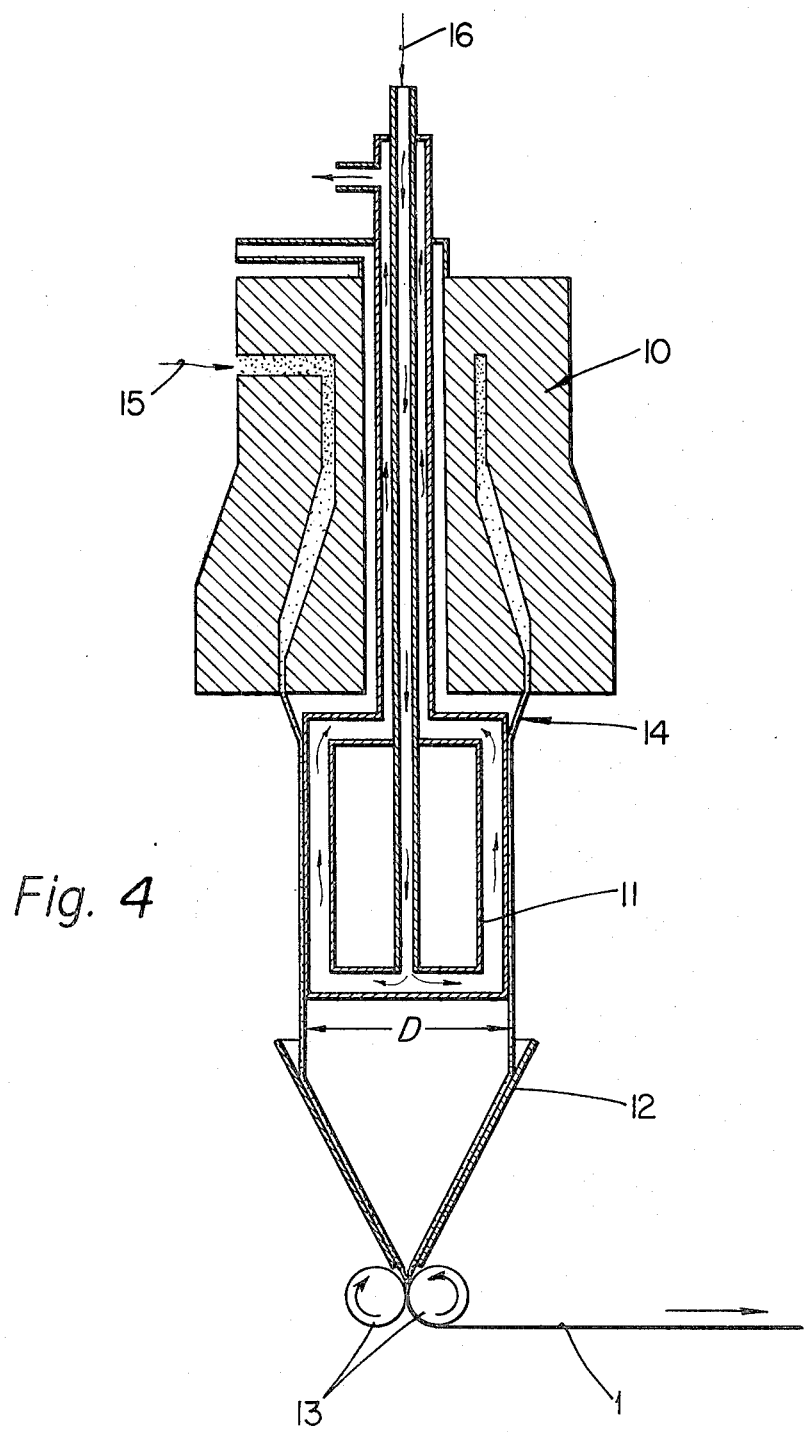
FIG. 4 is a schematic view in cross-section illustrating a die and cooled mandrel for producing a tubular film.

As shown schematically in FIG. 4, molten polyhexamethylene adipamide 15 is extruded through openings in die-10 to produce tubular molten film 14 which is brought into contact with mandrel 11. A cooling medium 16, such as water, is circulated through the mandrel to control the cooling rate of tubular film 14. After passing mandrel 11, the cooled tubular film comes in contact with reflector 12 and is gathered by pinch rollers 13 to produce a flat sheet of cooled undrawn tubular film 1.

The undrawn tubular film is biaxially drawn by using a conventional tubular biaxial stretcher, for example, of the type shown in FIG. 1. In FIG. 1, an undrawn tubular film 1 of diameter D (which diameter is, of course, equal to diameter D of FIG. 4) passes between a pair of low speed nip rollers 2 and then through a cooling ring 3 for fixing the drawing initiating point. The tubular film is heated by hot air, which is blown against the film through a hot air blowing ring 5 and flows downward inside a heat-controlling hood 6. A shielding elastomer plate 4 lies between the cooling ring 3 and the hot air blowing ring 5. The heated tubular film is drawn biaxially in the M.D. by the speed difference between high speed nip rollers 8 and the low speed nip rollers 2, and in the T.D. by the gas enclosing bubble. The bubble is brought in sliding contact with the inner wall of a deflator 7 and withdrawn as a drawn film 9.

The drawing temperature is preferably in the range of from 70° C. to 180° C., which temperature means the temperature of hot air blown off through the ring 5 in the stretcher shown in FIG. 1.

The drawing ratios X and Y in the M.D. and T.D., respectively, should both preferably be in the range of from 2.5 to 4.0 and be such that the difference in the two drawing ratios $|X-Y|$ is below 0.5. When the drawing ratios X and Y are less than 2.5, the intended initial modulus of elasticity in tension cannot be obtained and the resultant film is poor in penetration strength. When the drawing ratios X and Y exceed 4.0, the film tends to be broken and is difficult to uniformly draw.

In the tubular biaxial drawing of polyhexamethylene adipamide films, necking is liable to develop in the circumferential direction. This necking results in non-uniformity in transparency of the film, even though the non-uniformity in thickness is negligible. In order to avoid or minimize such necking development and, further, to smoothly effect the drawing, the parameter "α" as defined below should preferably be at least 2.5 but less than 8.0. When the parameter α is less than 2.5, necking develops around the circumference of the film near the point at which the drawing in the T.D. is initiated, and such necking leads to unevenness in transparency of the drawn film. When the parameter α is 8.0 or more, the film bubble is not stable and fluctuation of the drawing ratio in the T.D. is found to a considerable extent.

The parameter "α" is defined by the following equation.

Parameter $\alpha = l/r$ wherein, as illustrated in FIG. 2 showing the cross-section of the film bubble, l is the length along the vertical line between the point P at which the drawing in the T.D. is initiated and the point Q at which the drawing ratio in the T.D. is ½ of the final drawing ratio in the T.D.; and is r ¼ of the difference in length between the diameter of the tubular film at the point R at which the drawing in the T.D. is terminated and the diameter of the tubular film at the point at which the drawing in the T.D. is not initiated yet. Both l and r may be measured on a photograph of the film bubble.

The parameter α may be varied by changing length and diameter of the hood, the temperature of hot air blown against the tubular extrudate, the drawing ratio and the amount of air in the bubble.

The importance of the parameter α will be seen from the following example. Polyhexamethylene adipamide having a relative viscosity of 3.8 (25° C. 96% $H_2SO_4$) was melt-extruded at a temperature of 280° C. through a circular die gap having a diameter of 160 mm, and the tubular extrudate was brought in sliding contact with an inside mandrel having a diameter of 155 mm. The cooling rate was 1,050° C./sec. and the hauling-off speed was 4.5 m/min. The undrawn film so obtained had a thickness of 110 microns. Then, the undrawn film was fed at a speed of 4.5 m/min. to a tubular biaxial stretcher of the type shown in FIG. 1, where the film was drawn concurrently in the M.D. and the T.D. under the conditions shown in Table II, below. The inner diameter of the heat-controlling hood was 580 mm. Unevenness in transparency of the drawn film and the drawing properties are shown in Table II, below.

TABLE II

| Run No. | Drawing ratio M.D. | Drawing ratio T.D. | Drawing temperature (°C.) | Heating hood length L (mm) | Inner pressure in film bubble (kg/cm²) | α | Unevenness in transparency of drawn film | Film bubble stability and uniformity of drawing ratio |
|---|---|---|---|---|---|---|---|---|
| 1 | 2.8 | 3.0 | 110 | 800 | 0.068 | 9.2 | Not found | Very poor |
| 2 | 3.0 | 3.1 | 110 | 800 | 0.071 | 8.0 | Not found | Very poor |
| 3 | 3.0 | 3.5 | 140 | 550 | 0.056 | 6.1 | Not found | Good |
| 4 | 3.0 | 3.3 | 110 | 550 | 0.074 | 5.5 | Not found | Good |
| 5 | 3.0 | 3.1 | 110 | 550 | 0.072 | 2.5 | Not found | Good |
| 6 | 3.0 | 3.4 | 110 | 550 | 0.076 | 2.4 | Found | Good |
| 7 | 3.0 | 3.0 | 110 | 300 | 0.071 | 1.0 | Considerably found | Good |

The biaxially drawn film is usually heat-treated in order to impart to the film satisfactory dimensional stability, which is particularly useful in a packaging material for a high retort pouch. However, polyhexamethylene adipamide is liable to be more subject to oxidative degradation than poly-epsilon-capramide. Accordingly, the heat treatment should preferably be carried under the conditions satisfying the formulae:

$$190 \leq T(°C.) < 240$$

$$-78.9 \cdot \log t + 268 \leq T(°C.) \leq -106.8 \cdot \log t + 388$$

wherein T is a heating temperature in °C. and t is a heating period in second. Provided that these conditions are satisfied, the heat treatment can be carried out by means of a conventional method.

The criticality of the above-mentioned heat-treating conditions will be seen from the following example. Biaxially drawn film specimens were clipped at their two end portions. The clipped specimens were heat-treated in a hot air oven under the conditions shown in Table III, below. During the heat treatment, a tension was applied to each film specimen in the longitudinal direction to an extent such that shrinkage of the film specimen in the transverse direction was restrained to below 5%. The heat-treated film specimens were tested for their shrinkages by exposing them to steam at a temperature of 135° C. for 10 minutes. The change in appearance of the film specimens after the exposure to steam was also observed. The test results are shown in Table III, below.

TABLE III

| | Heat-treating condition | | Film Properties | | | |
|---|---|---|---|---|---|---|
| | Temperature | Time period | Crystallinity degree | Shrinkage in steam (135° C. × 10 min.) | | Appearance after steam |
| Run No. | (°C.) | (sec.) | (%) | MD | TD | treatment |
| 1 | 240 | 2 | | Broken upon steaming | | |
| 2 | 230 | 2 | 32 | 13.2 | 10.1 | Not whitened |
| 3 | 230 | 4 | 37 | 3.4 | 3.2 | Not whitened |
| 4 | 230 | 10 | 40 | 2.3 | 2.0 | Not whitened |
| 5 | 230 | 25 | 43 | 2.1 | 1.8 | Not whitened |
| 6 | 230 | 30 | 46 | 2.0 | 1.6 | Whitened |
| 7 | 210 | 4 | 34 | 6.8 | 5.3 | Not whitened |
| 8 | 210 | 7 | 35 | 4.9 | 4.0 | Not whitened |
| 9 | 210 | 15 | 42 | 2.0 | 1.9 | Not whitened |
| 10 | 210 | 40 | 44 | 1.9 | 1.8 | Not whitened |
| 11 | 210 | 50 | 48 | 1.8 | 1.7 | Whitened |
| 12 | 190 | 7 | 33 | 10.2 | 9.1 | Not whitened |
| 13 | 190 | 15 | 36 | 4.0 | 3.7 | Not whitened |
| 14 | 190 | 20 | 41 | 2.4 | 2.2 | Not whitened |
| 15 | 190 | 50 | 43 | 2.2 | 1.7 | Not whitened |
| 16 | 190 | 100 | 46 | 2.0 | 1.6 | Whitened |

It is evaluated by the present inventions that a shrinkage of not more than 5% in any direction across substantially the entire surface, as determined by exposing the film to steam at 135° C. for 10 minutes, is satisfactory for the desired high temperature retarting food pouches, and; that a shrinkage of not more than 3% is completely satisfactory. As will be understood from Table III, when the films are heat-treated under the above-mentioned conditions, the heat-treated films exhibit satisfactorily reduced shrinkages and do not become whitened.

The film of the present invention possesses, as hereinbefore described, improved toughness, dimensional stability and gas barrier properties, and therefore, is useful as food-packaging materials for, for example: high retort pouches of instant pre-cooked curry sauces, hamburgers and meatballs; frozen food packages of shrimp and crab; packages of soup or soup base for instant noodles, and; large and small packages of liquids and pasty foods such as bean paste and konjak paste. Polyhexamethylene adipamide inherently exhibits good oil resistance and, therefore, the film of the present invention is useful for transporting packages of, for example, gasoline and kerosene. The film of the present invention is also useful for packages of a high explosive slurry and machine tools. Furthermore, the film of the present invention can be used in applications, other than packaging materials, such as a base for a metal-deposited film, an adhesive tape and an electrical insulation film.

The following examples are included to further illustrate the present invention, but are not intended to be limiting.

EXAMPLE 1

Polyhexamethylene adipamide having a relative viscosity ($\eta$rel) of 3.6, as measured at a temperature of 25° C. in aqueous 96% sulfuric acid, was supplied into an extruder, whereby the polymer was melted at a temperature of 280° C. and extruded downward through a circular die having a diameter of 160 mm. The tubular extrudate was brought in sliding contact with the periphery of a mandrel having a diameter of 155 mm and a surface roughness of 1S. The mandrel was internally cooled at a temperature of 40° C. by circulating therein warm water, for the purpose of quenching the tubular extrudate. The hauling-off speed of the tubular extrudate was 5 m/min., and the cooling speed thereof from 250° C. to 150° C. was 1,050° C./sec. Thus, an undrawn film having a thickness of 110 microns was obtained.

The undrawn film was concurrently biaxially drawn at a temperature of 100° C. and at draw ratios of 3.0 in the machine direction (i.e., longitudinal direction; hereinafter abbreviated as "M.D.") and 3.1 in the transverse direction (hereinafter abbreviated as "T.D"), by using a biaxial strecher similar to that shown in FIG. 1. Parameter alpha was 3.0.

The drawn film was flattened by using a deflator. A predetermined length of the flattened film was gripped by clips at both ends, and placed in an over provided with hot air blowers so that hot air was blown against both upper and lower outer surfaces of the flattened film, where the film was first pre-heated at a temperature of 150° C. for two seconds, and then, heated at a temperature of 230° C. for six seconds. The % of relaxation (i.e. % shrinkage) in T.D. was set at 4%. The heat-treated film had a thickness of 14.2 microns. The properties of the film are shown in Table IV, below.

TABLE IV

| rel (25° C., 96% H$_2$SO$_4$) | 3.3 |
|---|---|
| Birefringence ($\Delta$n) | 0.0005 |
| Initial modulus of elasticity in tension* | MD; 285 kg/mm$^2$ <br> TD; 280 kg/mm$^2$ |
| Tensile strength* | MD; 23.0 kg/mm$^2$ <br> TD; 22.3 kg/mm$^2$ |
| Elongation* | MD; 88% <br> TD; 92% |
| Shrinkage in steam (135° C. steam × 10 min.) | MD; 3.2% <br> TD; 2.9% |
| Change of appearance after steam treatment | Not found |
| Penetration strength | 0.76 kg |
| Unevenness in transparency | Not found |

*Determined in accordance with ASTM D-882 at grip separation speed of 100 mm/min.

EXAMPLE 2

Following the procedure and conditions set forth in Example 1, biaxially drawn polyhexamethylene adipamide films were produced, wherein polyhexamethylene adipamides having relative viscosities of 3.2, 3.5 and 3.8 were separately used instead of the relative viscosity of 3.6. The properties of the resultant films are shown in Table V, below.

TABLE V

| Film properties | Polymer rel | | | |
| | 3.2 | 3.5 | 3.6 (=Ex. 1) | 3.8 |
|---|---|---|---|---|
| $\eta$rel | 3.0 | 3.25 | 3.3 | 3.4 |
| Crystallinity degree (%) | 40 | 39 | 39 | 38 |
| Birefringence ($\Delta$n) | 0.0005 | 0.0006 | 0.0005 | 0.0005 |
| Initial modulus of elasticity in tension (kg/mm$^2$) | 291 <br> 283 | 287 <br> 281 | 285 <br> 280 | 285 <br> 281 |
| Shrinkage in steam (%) (135° C. × 10 min.) | 3.0 <br> 2.9 | 3.3 <br> 2.9 | 3.2 <br> 2.9 | 4.0 <br> 3.0 |
| Penetration strength (kg/15 micron) | 0.53 | 0.65 | 0.76 | 0.81 |

EXAMPLE 3

Biaxially drawn polyhexamethylene adipamide films were produced following the procedure and under conditions similar to those set forth in Example 1, except for the following.

| Relative viscosity ($\eta$rel) | = 3.8 |
|---|---|
| Extrusion temperature | = 285° C. |
| Thickness of undrawn films | = 120 microns |
| Drawing temperature | = 110° C. |
| Drawing ratio | = shown in Table VI, below |

The properties of the resultant films are shown in Table VI, below.

TABLE VI

| Drawing ratio | (MD) (TD) <br> 2.5 × 2.3 | (MD) (TD) <br> 2.6 × 2.8 | (MD) (TD) <br> 3.0 × 3.1 |
|---|---|---|---|
| Drawability | Necking found and film thickness not uniform | good | good |
| Film thickness (micron) | 28 ± 20% | 17 ± 6% | 15 ± 5% |
| Film properties | | | |
| Initial modulus of elasticity in tension (kg/mm$^2$) | | | |
| MD | 200 | 235 | 270 |
| TD | 205 | 240 | 273 |
| Penetration strength (kg/15 micron) | 0.40 | 0.60 | 0.75 |
| Shrinkage in steam (%) | | | |
| MD | 2.1 | 2.9 | 3.3 |
| TD | 2.3 | 2.9 | 3.2 |

EXAMPLE 4

Following the procedure and conditions set forth in Example 1, biaxially drawn polyhexamethylene adipamide films were produced, wherein the drawing and heat-treating conditions were varied as shown in Table VII, below. The heat treatment was conducted after each drawn film was pre-heated at a temperature of 100° C. to 150° C. and, during the heat treatment, tension was applied to each film only in the M.D. to an extent such that the percent of relaxation, i.e. the percent of shrinkage, of the film in T.D. was restrained to below 5%. The results are shown in Table VII, below. In Table VII the penetration strength was expressed in terms of a film thickness of 15 microns.

TABLE VII

| Run No. | Drawing condition Temperature (°C.) | Drawing ratio MD | Drawing ratio TD | α | Heat-treating condition Temperature (°C.) | Time period (sec.) | Film thickness (micron) | ηrel | Crystallinity degree (%) | Δn × 10⁻³ | Initial modulus of elasticity in tension (kg/mm²) MD | Initial modulus of elasticity in tension (kg/mm²) TD | Penetration strength (kg) | Shrinkage in steam (135° C. × 10 min.) MD | Shrinkage in steam (135° C. × 10 min.) TD |
|---|---|---|---|---|---|---|---|---|---|---|---|---|---|---|---|
| 1 | 100 | 2.7 | 3.5 | 2.2 | 230 | 6 | 14.0 | 3.3 | 39 | 8.0 | 241 | 290 | 0.45 | 2.5 | 4.5 |
| 2 | 100 | 2.8 | 3.4 | 2.3 | 230 | 6 | 14.5 | 3.35 | 40 | 6.5 | 250 | 286 | 0.5 | 3.0 | 4.3 |
| 3 | 100 | 3.0 | 3.1 | 3.0 | 230 | 6 | 14.2 | 3.3 | 40 | 5.0 | 285 | 280 | 0.76 | 3.2 | 2.9 |
| 4 | 100 | 3.0 | 3.0 | 3.0 | 230 | 6 | 14.8 | 3.3 | 38 | 3.0 | 285 | 273 | 0.8 | 3.1 | 3.0 |
| 5 | 130 | 3.1 | 3.1 | 4.0 | 230 | 6 | 14.0 | 3.25 | 39 | 1.0 | 286 | 275 | 0.9 | 4.8 | 4.5 |
| 6 | 150 | 3.1 | 3.1 | 4.0 | 230 | 6 | 14.0 | 3.25 | 40 | 1.5 | 283 | 280 | 0.85 | 4.5 | 4.4 |
| 7 | 170 | 3.1 | 3.1 | 4.5 | 230 | 6 | 14.0 | 3.2 | 40 | 1.0 | 278 | 276 | 0.9 | 4.4 | 4.2 |

As can be seen from Table VII, the birefringence (Δn) of films should be not more than 0.006 for the desired film of improved stress-breaking resistance and penetration strength.

EXAMPLE 5

This example is a comparative example, wherein an undrawn polyhexamethylene adipamide film was not concurrently but sequentially drawn in the biaxial directions according to the procedure set forth in the present inventor's Japanese Laid-open Patent Application 49,268/1976.

Polyhexamethylene adipamide, having a relative viscosity (ηrel) of 3.6, was melt-extruded in a manner similar to that set forth in Example, thereby to obtain a substantially amorphous undrawn film having a thickness of 150 microns. The undrawn film was first drawn in the transverse direction at a temperature of 80° C. and at a draw ratio of 2.9, by using a tenter. Then, the film was drawn in the longitudinal direction at a draw ratio of 3.5, by using a roller stretcher, while the temperature of the film at the drawing point was maintained at 120° C., by using an infrared heater. The drawing speed in the roller stretcher was 120,000%/min. The drawing in the longitudinal direction could not be smoothly carried out at a draw ratio of 3.3. The biaxially drawn film (2.9 T.D.×3.5 M.D.) was heat-treated at a temperature of 220° C. by using a heated roller, while a tension was applied only to the M.D. to an extent such that the percentage of shrinkage of the film in the T.D. was restrained to 3%. The contact time was seven seconds.

The properties of the resultant film are shown in Table VIII, below.

TABLE VIII

| | |
|---|---|
| Film thickness | 14.9 micron |
| η rel | 3.3 |
| Crystallinity degree | 35% |
| Birefringence (Δ n) | 9.0 × 10⁻³ |
| Initial modulus of elasticity in tension (kg/mm²) | MD 305 TD 185 |
| Penetration strength | 0.40 kg/15 micron |
| Shrinkage in steam (135° C. × 10 min.) | MD 6.5% TD 1.8% |

EXAMPLE 6

This example is a comparative example, wherein commercially available biaxially drawn polyethylene terephthalate film and nylon-6 film were tested. The commercially available biaxially drawn films tested were: (1) a biaxially drawn polyethylene terephthalate film having a thickness of 12 microns; (2) a nylon-6 film A, having a thickness of 15 microns, concurrently biaxially drawn by using a tenter, and; (3) a nylon-6 film B, having a thickness of 15 microns, biaxially drawn by a tubular drawing procedure. The penetration strength and percentage of shrinkage in steam of these films are shown in Table IX, below.

TABLE IX

| | Penetration strength (kg) | Shrinkage in steam (135° C. × 10 min) (%) |
|---|---|---|
| Biaxially drawn PET film | 0.29 | MD 1.5 TD 1.0 |
| Biaxially drawn PET film (in terms of 15 micron thickness) | 0.37 | — |
| Biaxially drawn nylon-6 film A (15 micron thickness) | 0.53 | MD 18.3 TD 16.2 |
| Biaxially drawn nylon-6 film B (15 micron thickness) | 0.55 | MD 20.1 TD 19.2 |

As can be seen from Table IX, commercially available biaxially drawn polyhexamethylene adipamide films and polyethylene terephthalate films are not satisfactory in at least one of toughness and dimensional stability to hot water.

EXAMPLE 7

Various biaxially drawn polyhexamethylene adipamide films were produced following the procedure and under conditions similar to those set forth in Example 1, except that the relative viscosities of polymers and the film-forming, -drawing and -heat-treating conditions were varied as shown in Table X, below. The heat treatment was carried out after each drawn film was pre-heated at a temperature of 150° C. for two seconds and, during the heat treatment, tension was applied to each film only in the M.D. to an extent such that the percentage of shrinkage of the film in T.D. was restrained to 4%. Among the film specimens, film specimens of Run Nos. 3 and 6 were very poor in drawability and the drawn films exhibited a large unevenness in transparency. Accordingly, these two drawn films were not heat-treated.

The properties of the resultant films are shown in Table X, below. In Table X, the penetration strength was expressed in terms of film thickness of 15 microns.

TABLE X

| Run No. | Film-forming condition ||||| Heat-treating condition ||  Draw-ability | Uneven-ness in trans-parency | $\eta_{rel}$ | $\Delta n \times 10^{-3}$ | Crystal-linity degree (%) | Film property |||||
|---|---|---|---|---|---|---|---|---|---|---|---|---|---|---|---|---|
| | Polymer $\eta_{rel}$ | Cooling rate (°C./sec) | Temper-ature (°C.) | Drawing ratio || | Temper-ature (°C.) | Time period (sec) | | | | | | Initial Modulus of elasticity in tension (kg/mm²) || Penetration strength (kg/15mic) | Shrinkage in steam (%) (135° C. × 10 min) || Appearance after steam treatment |
| | | | | MD | TD | α | | | | | | | | MD | TD | | MD | TD | |
| 1 | 3.2 | 1,300 | 110 | 3.1 | 3.2 | 3.0 | 220 | 10 | good | Not found | 3.0 | 0.4 | 37 | 270 | 271 | 0.55 | 3.3 | 3.3 | Not whitened |
| 2 | 3.5 | 880 | 130 | 3.0 | 3.0 | 4.0 | 220 | 10 | good | Not found | 3.25 | 0.5 | 37 | 268 | 267 | 0.63 | 3.4 | 3.2 | Not whitened |
| 3 | 3.8 | 1,050 | 110 | 3.1 | 3.1 | 8.0 | — | — | * | — | — | — | — | — | — | — | — | — | — |
| 4 | 3.8 | 1,050 | 110 | 3.0 | 3.3 | 5.5 | 230 | 6 | good | Not found | 3.4 | 3.0 | 38 | 271 | 275 | 0.81 | 3.0 | 3.1 | Not whitened |
| 5 | 3.8 | 1,050 | 110 | 3.0 | 3.1 | 2.5 | 230 | 6 | good | Not found | 3.4 | 4.0 | 38 | 274 | 273 | 0.78 | 3.0 | 3.1 | Not whitened |
| 6 | 3.8 | 1,050 | 110 | 3.0 | 3.0 | 1.0 | — | — | good | Consid-erably found | — | — | — | — | — | — | — | — | — |
| 7 | 3.8 | 1,460 | 140 | 3.0 | 3.2 | 4.0 | 230 | 2 | good | Not found | 3.5 | 0.9 | 32 | 259 | 264 | 1.10 | 13.2 | 10.1 | Not whitened |
| 8 | 3.8 | 1,460 | 140 | 3.0 | 3.2 | 4.0 | 230 | 4 | good | Not found | 3.45 | 0.9 | 37 | 265 | 267 | 0.95 | 3.4 | 3.2 | Not whitened |
| 9 | 3.8 | 1,460 | 140 | 3.0 | 3.2 | 4.0 | 230 | 10 | good | Not found | 3.3 | 0.9 | 40 | 284 | 287 | 0.85 | 3.3 | 2.0 | Not whitened |
| 10 | 3.8 | 1,460 | 140 | 3.0 | 3.2 | 4.0 | 230 | 30 | good | Not found | 3.25 | 0.9 | 46 | 300 | 305 | 0.53 | 2.0 | 1.6 | Not whitened |
| 11 | 3.8 | 1,460 | 140 | 3.0 | 3.2 | 4.0 | 210 | 4 | good | Not found | 3.5 | 0.9 | 34 | 262 | 264 | 1.0 | 6.8 | 5.3 | Not whitened |
| 12 | 3.8 | 1,460 | 140 | 3.0 | 3.2 | 4.0 | 210 | 7 | good | Not found | 3.4 | 0.9 | 35 | 263 | 264 | 0.95 | 4.9 | 4.0 | Not whitened |
| 13 | 3.8 | 1,460 | 140 | 3.0 | 3.2 | 4.0 | 210 | 15 | good | Not found | 3.25 | 0.9 | 42 | 291 | 295 | 0.78 | 2.0 | 1.9 | Not whitened |
| 14 | 3.8 | 1,460 | 140 | 3.0 | 3.2 | 4.0 | 210 | 50 | good | Not found | 3.10 | 0.9 | 48 | 315 | 316 | 0.50 | 1.8 | 1.7 | Not whitened |
| 15 | 4.2 | 1,390 | 130 | 2.8 | 2.9 | 4.0 | 230 | 6 | good | Not found | 3.7 | 0.7 | 37 | 260 | 260 | 0.80 | 4.1 | 4.0 | Not whitened |
| 16 | 4.7 | 1,300 | 150 | 2.7 | 2.7 | 4.0 | 230 | 6 | good | Not found | 3.9 | 0.5 | 37 | 259 | 253 | 0.81 | 4.3 | 4.1 | Not whitened |

What we claim is:

1. A process for producing a biaxially drawn polyhexamethylene adipamide film wherein molten polyhexamethylene adipamide is extruded through a circular die gap and the tubular extrudate is brought in sliding contact with the outer periphery of an inside mandrel thereby to be cooled, characterized in that polyhexamethylene adipamide having a relative viscosity ($\eta$rel) of from 3.3 to 5.0, as measured at a temperature of 25° C. in aqueous 96% sulfuric acid, is used, and the tubular extrudate formed therefrom is cooled at a cooling rate (X° C./sec.) satisfying the following formula with respect to the relative viscosity ($\eta$rel) of the polymer used, $$-100 \times \eta\text{rel} + 1,200 < X < -170 \times \eta\text{rel} + 2,150$$

at least in the cooling stage in which the tubular extrudate is cooled from 250° C. to 150° C.; and then, the obtained tubular film is concurrently biaxially drawn.

2. The process according to claim 1 wherein the polyhexamethylene adipamide has a relative viscosity ($\eta$rel) of from 3.5 to 4.8.

3. The process according to claim 1 wherein the biaxial drawing of the tubular film is effected concurrently, in the longitudinal (machine) direction and in the transverse direction while the parameter $\alpha$, defined in the specification, is maintained at a bubble satisfying the formula:

$$2.5 \leq \alpha < 8.0$$

4. The process according to claim 1 wherein the biaxial drawing of the tubular film is effected at a temperature of from 70° to 180° C. and at a drawing ratio of from 2.5 to 4.0 both in the longitudinal (machine) direction and the transverse direction.

5. The process according to anyone of claims 1, 3 and 4 wherein the biaxially drawn film is further heat-treated under the conditions satisfying the formulae:

$$190 \leq T(°C.) < 240$$

$$-78.9 \cdot \log t + 268 \leq T(°C.) \leq -106.8 \cdot \log t + 388$$

wherein T is a heating temperature in °C. and t is a heating period in second.

6. A biaxially drawn polyhexamethylene adipamide film obtained by the process according to claim 5.

* * * * *